United States Patent [19]

Dorner

[11] Patent Number: 4,993,916
[45] Date of Patent: Feb. 19, 1991

[54] HIGH SPEED STACKING APPARATUS

[75] Inventor: Wolfgang C. Dorner, Oconomowoc, Wis.

[73] Assignee: Dorner Mfg. Corp., Hartland, Wis.

[21] Appl. No.: 477,176

[22] Filed: Jan. 29, 1990

Related U.S. Application Data

[63] Continuation of Ser. No. 226,461, Aug. 1, 1988, abandoned.

[51] Int. Cl.[5] .............................................. B65G 57/00
[52] U.S. Cl. .............................. 414/798.7; 198/468.11; 414/790.5; 414/790
[58] Field of Search ......................................... 198/442

[56] References Cited

U.S. PATENT DOCUMENTS

| | | | |
|---|---|---|---|
| 1,402,223 | 1/1922 | Fogde et al. | 414/798.7 X |
| 1,433,328 | 10/1922 | Wright . | |
| 1,703,466 | 2/1929 | Wright . | |
| 2,698,693 | 1/1955 | Nordquist | 198/442 X |
| 3,056,513 | 10/1962 | Von Gal, Jr. | 414/80 X |
| 3,056,514 | 10/1962 | Williamson | 414/80 X |
| 3,225,942 | 12/1965 | Fossenier | 414/57 |
| 3,228,538 | 1/1966 | Coates | 414/790.5 X |
| 3,263,829 | 8/1966 | Verrinder et al. | 414/118 |
| 3,533,517 | 10/1970 | Heide | 414/80 X |
| 3,676,978 | 7/1972 | Gottweis et al. | 198/442 X |
| 4,162,870 | 7/1979 | Storm | 414/790.5 X |
| 4,398,383 | 8/1983 | Prakken | 53/247 X |

FOREIGN PATENT DOCUMENTS

| | | | |
|---|---|---|---|
| 0139288 | 5/1985 | European Pat. Off. | 414/108 |
| 1094233 | 12/1960 | Fed. Rep. of Germany | 271/180 |
| 2252271 | 6/1975 | France | 198/442 |
| 969661 | 9/1964 | United Kingdom | 198/468.11 |

Primary Examiner—Robert J. Spar
Assistant Examiner—William M. Hienz
Attorney, Agent, or Firm—Andrus, Sceales, Starke & Sawall

[57] ABSTRACT

A high speed apparatus for stacking articles in a side by side relation and transfering the stack to a conveyor. Each article is fed onto a pair of spaced support members and against a movable backstop to form a stack of side by side articles. When a stack of desired size has been formed, the support members are pivoted to a release position and the stack is lowered to a discharge station. When the stack is lowered sufficiently to clear the backstop, the backstop is returned to its original position, and as the stack is lowered to a position beneath the release support members, the support members are returned to their supporting position. The backstop and support members are then in a ready position to form a second stack before the first stack reaches the discharge station. The first stack is then discharged to a main conveyor while a second stack is formed at the stacking station.

4 Claims, 2 Drawing Sheets

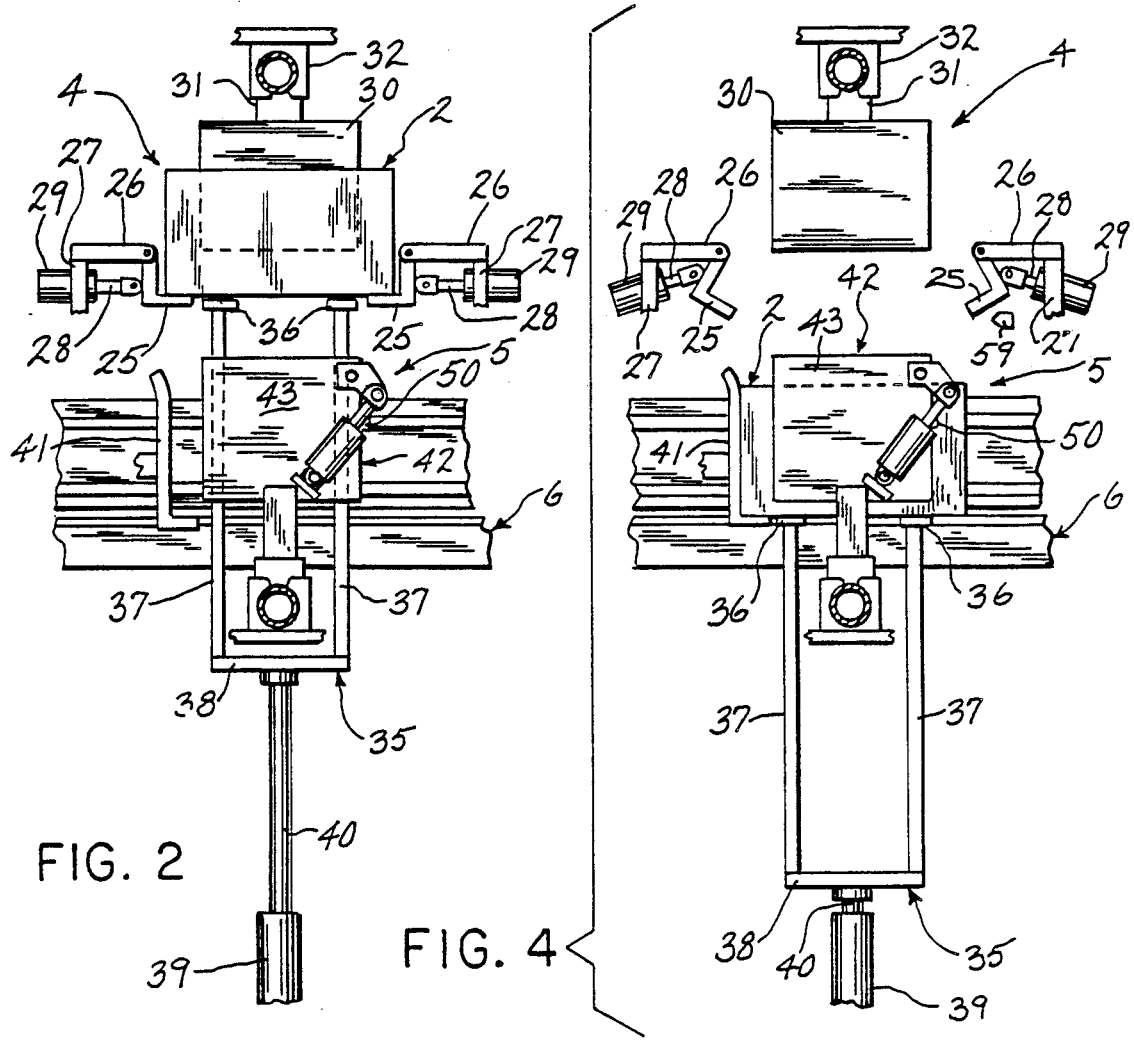

HIGH SPEED STACKING APPARATUS

This is a continuation of application Ser. No. 07/226,461, filed Aug. 1, 1988, now abandoned.

BACKGROUND OF THE INVENTION

In conveyor systems for conveying small articles, such as video cassette boxes, it is often desired to stack the articles in a side by side relation and convey the stacks to working equipment or a storage site. Frequently, a conveyor system will include a group of stacking stations, each operating to stack articles into individual stacks and the stacks are then transferred to a main conveyor. The transfer mechanism is programmed so that the stacks are transferred to the main conveyor without interference from other stacks moving on the conveyor.

U.S. patent application Ser. No 07/118,534, filed Nov. 9, 1987, now U.S. Pat. No. 4,861,226, describes an apparatus for stacking articles and transferring the stacks onto a main conveyor. In the system of the aforementioned patent application individual articles are transferred from an infeed conveyor to a stacking station where the articles are stacked against a movable stop. When a stack of desired size has been formed, the stack is pushed across a horizontal surface to a discharge station which is located laterally of a main conveyor. The stack is then transferred laterally from the discharge station to the main conveyor.

With the stacking apparatus as disclosed in the aforementioned application it is necessary to return the pusher mechanism to its original position before a second stack can be formed at the stacking station. While this system operates satisfactorily at lower speeds, it is often desired to provide a system which can operate at higher speeds.

SUMMARY OF THE INVENTION

The invention is directed to an improved high speed apparatus for stacking articles in a side by side stack and transferring the stack to a main conveyor. In accordance with the invention, the articles are conveyed on an infeed conveyor and each article is transferred laterally onto a pair of spaced support members and against a movable backstop to form a stack. When a stack of desired size has been formed, the support members are pivoted to a release position and the stack is lowered by a lowering mechanism to a discharge station. When the upper edge of the downwardly moving stack clears the lower edge of the backstop, the backstop is returned to its original position adjacent the infeed conveyor, and as the upper edge of the stack clears the released support members. The support members are returned to their original supporting position. Thus, the backstop and support members are in a ready position to form a second stack before the first stack reaches the discharge station.

The first stack is then discharged laterally from the discharge station onto a discharge conveyor by a transfer mechanism, and the transfer mechanism includes a pivoting gate which maintains the articles in side-by-side alignment on the moving discharge conveyor until the entire stack is positioned on the conveyor. The gate is then released to permit the stack to move on the discharge conveyor.

The apparatus provides a high speed mechanism for stacking articles in a side by side relation and transferring the stack to a discharge conveyor. With the mechanism of the invention, the stacking station is in a ready position to receive a second stack before the first stack has reached the discharge station. This substantially improves the overall speed of operation of the mechanism.

Other objects and advantages will appear in the course of the following description.

DESCRIPTION OF THE DRAWINGS

The drawings illustrate the best mode presently contemplated of carrying out the invention.

In the drawings:

FIG. 2 is a vertical section taken along line 2—2 of FIG. 3.

FIG. 4 is a view similar to FIG. 2 showing the stack lowered to the discharge station; and FIG. 5 is an enlarged fragmentary end view showing the mechanism for pivoting the gate on the transfer unit.

DESCRIPTION OF THE ILLUSTRATED EMBODIMENT

Figure 1:
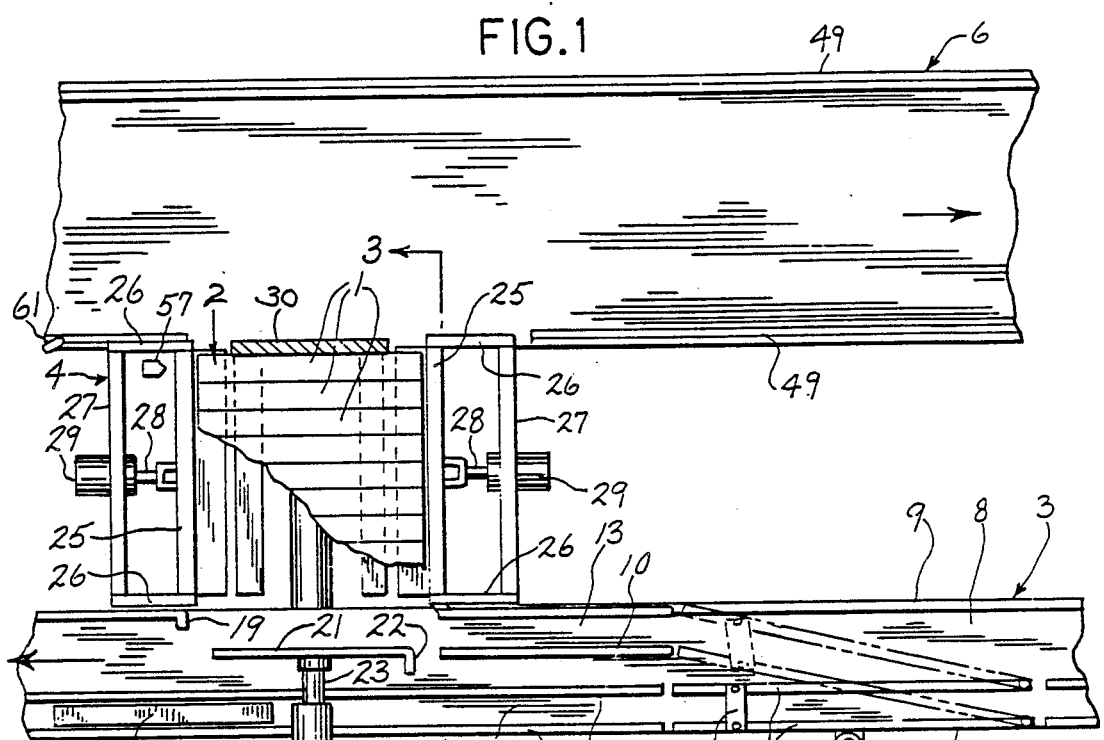
FIG. 1 is a plan view of the apparatus of the invention.

The drawings illustrate a mechanism for stacking articles 1 in side by side relation to form a stack 2 and then transferring the stack onto a discharge conveyor or to a discharge site. While the articles 1 are illustrated as being generally rectangular in shape, such as video cassette containers, it is comtemplated that the articles can have various configurations.

In general, the articles 1 are conveyed on an infeed conveyor 3 and are individually transferred from the conveyor to a stacking station 4 to form a stack 2. The stack is then lowered from the stacking station 4 to a discharge station 5 and is then transferred from the discharge station to a main or discharge conveyor 6. In practice there may be a series of stacking stations 4 located along main conveyor 3 and stacks 2 will be formed at each stacking station and transferred to the discharge conveyor 6.

The infeed conveyor 3 is of conventional construction and includes a generally U-shaped frame 7 which carries a belt 8 for endless travel. Guide rails 9 extend upwardly from the sides of the conveyor. In addition a pair of intermediate guide rails 10 and 11 are located above belt 8 between side rails 9 and define a pair of lanes 12 and 13 for travel of the articles 1. Articles 1 move along conveyor 3 in the direction of the arrow and are fed to one of the lanes 12 or 13 by a movable gate 14. Gate 14 includes a pair of parallel rails 15 and the upstream end of each rail 15 is pivotally connected to the conveyor structure about a vertical axis so that the gate 14 can be pivoted from a straight-through position where it will direct the articles through the through lane 12, or as shown by the dash lines in FIG. 1, to a diagonal position to direct the articles to lane 13 for stacking.

Rails 15 are connected by an arch 17 and can be pivoted between the straight-through and diagonal positions by a fluid cylinder unit 18 which is connected to one of the rails.

In practice, the articles 1 may include a bar code, and a bar code reader located upstream of gate 14 will act to operate cylinder 18 to direct the articles either through the through lane 12 or into the lane 13 for stacking at the stacking station 4.

The articles moving into the stacking lane 13 will contact a stop 19 which extends laterally inward from one of the guide rails 9 and will stop the article on the moving conveyor belt 8 in alignment with the stacking station 4.

The article stopped by stop 19 is transferred from the conveyor 3 to the stacking station 4 by a pusher mechanism indicated generally by 20. Pusher mechanism 20 includes a generally vertical plate 21 having a lateral flange 22 at its upstream end, as best shown in FIG. 1. In its retracted position pusher plate 21 forms an extension to the intermediate guide rail 10.

Pusher plate 21 is adaped to be moved laterally of conveyor 3 by a fluid cylinder mechanism including a piston rod 23 which is connected to the rear surface of plate 21 and is movable within cylinder 24 that is mounted on the frame of the machine and extends above the rails 9 and 11. By extending piston rod 23, the pusher plate 21 will be moved across the conveyor 3 to push each article 1 to the stacking station 4.

Stacking station 4 includes a pair of generally L-shaped spaced supports 25 and the articles 1, as they are moved to the stacking station by pusher plate 21, will be supported on the horizontal legs of the supports 25.

Supports 25 are movable between a support position as shown in FIG. 2, and a release position as shown in FIG. 4. In this regard the upper edges of the vertical legs of supports 25 are pivotally connected to arms 26 and each pair of arms is connected to a bracket 27 which is supported by the frame of the machine.

Each support 25 is moved between the supporting and release position by a fluid cylinder unit including a piston rod 28 which is pivotally connected to the vertical leg of the support and is slidable within cylinder 29 which is supported from bracket 27.

In forming a stack, the first article moved onto the supports 25 by the pusher unit 20, will engage a backstop 30 which is secured to a carrier 31 of a rodless cylinder 32 that is mounted on the frame of the machine above the stacking station 4. Rodless cylinder 32 is a conventional type in which the carrier is connected to a piston that is slidable within the cylinder and extends through a slot in the cylinder.

At the beginning of the stacking operation backstop 30 is located adjacent the side edge of conveyor 3, and as the first article engages the backstop, the backstop will move in a direction away from conveyor 3 with only the friction of the piston in cylinder 32 resisting the movement. As each successive article 1 is moved against the previous article, the backstop 30 will move away from the conveyor 3 and support the stack 2. After the completed stack 2 has been moved downwardly to the discharge station 5, as will be hereinafter described, backstop 30 is returned to its original position adjacent conveyor 3 by power operation of the cylinder 32.

The stack 2 is transferred from stacking station 4 to discharge station 5 by a lowering mechanism 35. The lowering mechanism 35 includes a pair of parallel rails 36 which are located inwardly of the supports 25 as shown in FIG. 2. As the stack 2 is formed at the stacking station 4, rails 36 will be at a level slightly below the horizontal legs of supports 25.

Rails 36 are supported by a plurality of columns 37 and the lower ends of columns 37 are connected by a plate 38.

A hydraulic cylinder unit is employed to raise and lower the rails 36, and the hydraulic cylinder unit includes a cylinder 39 and a piston rod 40 which is slidable relative to cylinder 39 and is connected to the underside of plate 38.

With the supports 25 in the release position, piston rod 40 can be retracted to thereby lower rails 36 and move the station 2 from the stacking station 4 to the discharge station 5.

A side guide 41, as shown in FIGS. 2 and 4, is located at discharge station 5 and serves to guide the side edge of the stack as it is lowered to the discharge station.

Figure 3:
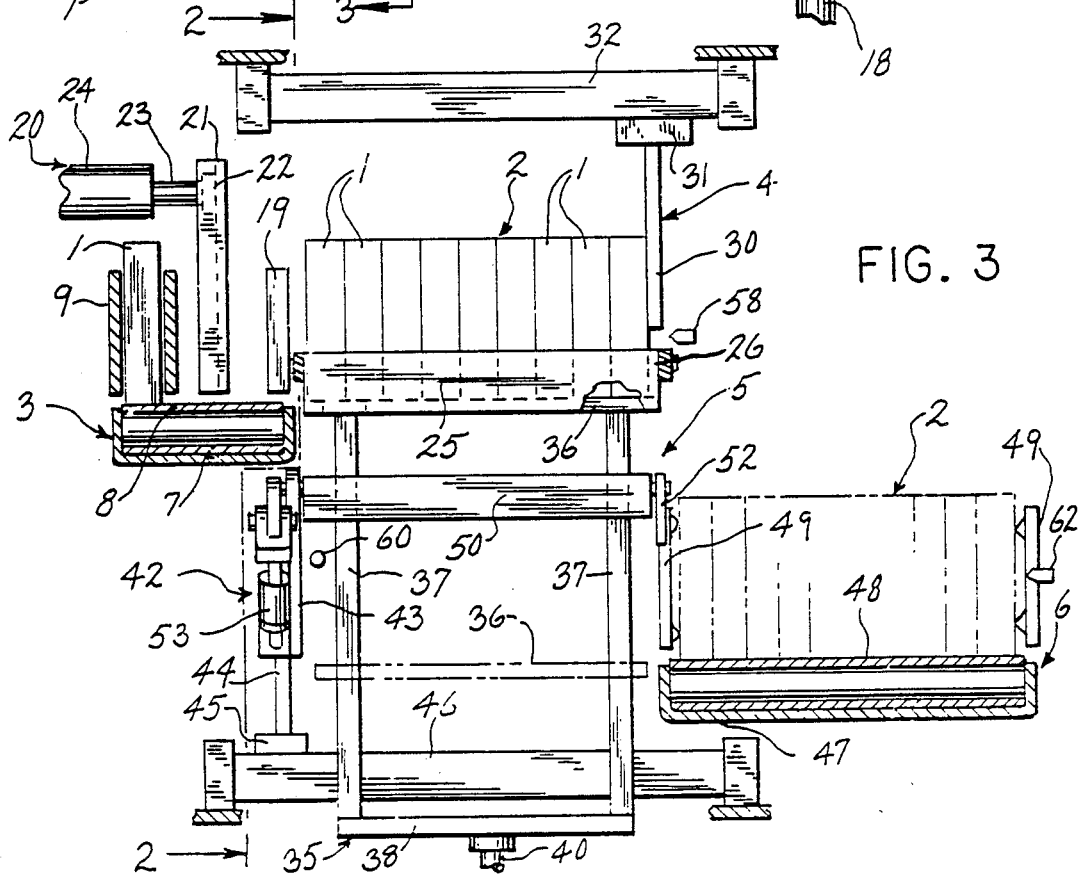
FIG. 3 is a section taken along line 3—3 of FIG. 1.

Stack 2 at discharge station 5 is then transferred laterally by a transfer mechanism indicated generally by 42. As best shown in FIG. 3, transfer mechanism 42 includes a vertical plate 43 which is connected through plate 44 to a carrier 45 of a rodless cylinder 46. Rodless cylinder 46 is similar in construction to a cylinder 32 previously described. Through operation of cylinder 46 the stack 2 will be pushed across rails 36 by pusher plate 43 onto the discharge conveyor 6.

As best illustrated in FIG. 3, conveyor 6 includes a general U-shaped frame 47 and a belt 48 is mounted for endless travel on frame 47. The upper run of belt 48 is substantially flush with rails 36, when rails 36 are in the lowered position, so that the stack 2 can be pushed from the rails onto the moving belt 48.

Guide rails 49 are mounted along the sides of the frame 47 to guide the stack in travel on the conveyor 6.

As belt 48 is moving the stack 2 is transferred thereon, a mechanism is included for maintaining the articles in the stack in proper side-by-side alignment until the stack is completely positioned on the moving belt. In this regard a pivotable gate 50 is carried by the transfer mechanism 42 and is positioned along the downstream side of the stack as the stack is moved onto conveyor 6. Gate 50 is mounted on a rod 51 which is supported for rotation by pusher plate 43 and a second plate 52 that is parallel to plate 43, as illustrated in FIG. 3. Gate 50 can be pivoted from a downward holding position, where the gate will prevent movement of the stack 2 on the conveyor 6, to an upper or non-obstructing position by a fluid cylinder 53. As shown in FIG. 5, piston rod 54 is slidable in cylinder 53 and is connected to bracket 55 which in turn is connected to rod 51. The opposite end of cylinder 53 is pivotably connected to bracket 56 on pusher plate 43. By extending piston rod 54, the gate 50 can be pivoted upwardly to an non-obstructing position, as shown by the dashed lines in FIG. 5, after the stack 2 is fully disposed on the conveyor 6 to release the stack for travel on the conveyor.

In accordance with a feature of the invention, the backstop 30 and supports 25 are returned to their ready position before the stack 2 reaches the discharge station 5 so that a second stack can be formed without the necessity of waiting for the rails 36 to be returned to their original position. To provide this action, a sensor 57 is mounted at the stacking station 4 in position to sense the formation of a stack of desired size, as shown in FIG. 1. The sensor can be any conventional type of sensing mechanism, such as a photoelectric eye or proximity switch. When a stack 2 of predetermined size has been formed, the sensor 57 will provide a signal to operate cylinders 29 to move the supports 25 to the release position and simultaneously operate cylinder 39 to lower the rails 36 to permit the stack 2 to be lowered to the discharge station 5.

A second sensor 58 is mounted in a position to sense when the upper edge of the stack 2 is lowered beneath the level of the lower edge of backstop 30, as shown in FIG. 3, thereby generating a signal to operate the backstop cylinder 32 to return the backstop to its original position adjacent infeed conveyor 3.

A third sensor 59, as shown in FIG. 4, is located in a position to sense when the upper end of the stack clears the lower edge of the released supports 25, and sensor 59 will generate a signal to operate the cylinders 29 to return the supports 25 to their original supporting position as shown in FIG. 1. Thus the backstop 30 is returned to its original position and the supports 25 are also returned to their original position before the stack 2 has reached the discharge station 5.

When the stack reaches the discharge station its presence is sensed by a sensor 60. In addition a sensor 61 is mounted to project a beam across discharge conveyor 6 (see FIG. 1) and when the sensor 61 indicates that there is no stack in the path of the beam, and if sensor 60 indicates that a stack is in position at the discharge station, cylinder 46 is operated to move the stack laterally onto the conveyor 6.

A sensor 62 located adjacent conveyor 6 will indicate when the stack has moved completely onto the conveyor 6 and will generate a signal to operate cylinder 53 to move the gate 50 to the open position to permit the stack to then move along the moving conveyor 6 to working equipment or to a storage site.

The apparatus of the invention substantially improves the speed of operation of stacking and transferring the stacks to a discharge conveyor in that the supports 25 and backstop 30 at the stacking station can be returned to their ready position before the previously formed stack is at the discharge station.

In addition the apparatus of the invention is more compact, occupying less floor space than prior stacking devices.

Various modes of carrying out the invention are contemplated as being within the scope of the following claims paricularly pointing out and distinctly claiming the subject matter which is regarded as the invention.

I claim:

1. A stacking apparatus, comprising stacking means for stacking a plurality of articles in side-by-side relation at a stacking station, said stacking means comprising movable support means mounted for movement between a support position where said support means supports said stack and a release position where said support means will not interefere with downward movement of said stack, said stacking means also including movable backstop means disposed to be engaged by a lead article as the lead article is fed to said stacking station and as a stack of articles is formed against said lead article, said backstop means being movable by the stack as it is formed between a stack forming position and a second stack completed position, means for lowering the stack from the stacking station to a discharge station, discharge conveyor means located adjacent said discharge station, transfer means for transferring the stack from said discharge station to said discharge conveyor means, and a movable gate attached to and movable with said transfer means during the transfer operation and disposed generally normal to the direction of travel of said discharge conveyor means, said gate being movable from an obstructing position where said gate prevents movement of said stack on said moving discharge conveyor means to a non-obstructing position whereby the articles in the stack will be released for movement in side-by-side alignment on said discharge conveyor means.

2. The apparatus of claim 1, and including means for mounting said support means for pivotal movement between said support and release positions.

3. The apparatus of claim 2, and including power operated means for moving said support means between said support and release positions.

4. The apparatus of claim 1, wherein said support means comprises a pair of spaced support members each mounted for pivotal movement between said support position and said release position, said support members disposed to engage opposite side edges of said stack when said support members are in the support position.

* * * * *